US011863599B2

(12) United States Patent
Filart et al.

(10) Patent No.: US 11,863,599 B2
(45) Date of Patent: Jan. 2, 2024

(54) SESSION INITIATION PROTOCOL (SIP) BASED TRANSFER OF USER INFORMATION FROM AN INVITING USER TO AN INVITED USER

(71) Applicant: T-Mobile Innovations LLC, Overland Park, KS (US)

(72) Inventors: Homer Nicolas B. Filart, Renton, WA (US); Shujaur Mufti, Snoqualmie, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/561,175

(22) Filed: Dec. 23, 2021

(65) Prior Publication Data

US 2023/0208893 A1 Jun. 29, 2023

(51) Int. Cl.
*H04L 65/1104* (2022.01)
*H04L 65/1016* (2022.01)
*H04L 9/40* (2022.01)
*H04L 65/1069* (2022.01)

(52) U.S. Cl.
CPC ........ *H04L 65/1104* (2022.05); *H04L 63/045* (2013.01); *H04L 63/0823* (2013.01); *H04L 65/1016* (2013.01); *H04L 65/1069* (2013.01)

(58) Field of Classification Search
CPC .............. H04L 65/1104; H04L 63/045; H04L 63/0823; H04L 65/1016; H04L 65/1069; H04L 64/1416; H04W 4/16
USPC ........................................................ 709/228
See application file for complete search history.

(56) References Cited

U.S. PATENT DOCUMENTS

| | | | |
|---|---|---|---|
| 7,839,987 B1* | 11/2010 | Kirchhoff | H04M 3/54 379/142.01 |
| 8,369,311 B1* | 2/2013 | Kirchhoff | H04M 3/42263 370/352 |
| 8,509,393 B2 | 8/2013 | Donovan | |
| 8,813,134 B2 | 8/2014 | Goodman et al. | |
| 9,008,293 B2 | 4/2015 | Qiu et al. | |
| 9,065,905 B2 | 6/2015 | Jackson et al. | |
| 9,509,837 B2 | 11/2016 | Van Wyk et al. | |
| 9,706,045 B2 | 7/2017 | Allen et al. | |
| 11,095,664 B2* | 8/2021 | Lu | H04W 12/12 |
| 2015/0111548 A1* | 4/2015 | Ali | H04M 3/42042 455/415 |
| 2021/0392173 A1* | 12/2021 | Chen | G06N 20/00 |

FOREIGN PATENT DOCUMENTS

CA       2572053 A1 *  7/2007    ......... H04L 63/0823

\* cited by examiner

*Primary Examiner* — Glenford J Madamba (57) ABSTRACT

In a wireless communication network, a user server receives the user information from an inviting user for presentation to an invited user. A Session Initiation Protocol (SIP) server receives an originating SIP invite to the invited user from the inviting user and transfers a request to the user server for the user information from the inviting user for the invited user. The user server responds with the user information from the inviting user for the invited user. The SIP server transfers a terminating SIP invite for the invited user from the inviting user that has the user information from the inviting user for the invited user. A User Equipment (UE) receives terminating SIP invite and responsively presents the user information from the inviting user to the invited user.

20 Claims, 9 Drawing Sheets

SESSION INITIATION PROTOCOL (SIP) BASED TRANSFER OF USER INFORMATION FROM AN INVITING USER TO AN INVITED USER

TECHNICAL BACKGROUND

Wireless communication networks provide wireless data services to wireless user devices. Exemplary wireless data services include internet-access, media-streaming, and social-networking. Exemplary wireless user devices comprise phones, computers, vehicles, robots, and sensors. The wireless user devices execute user applications that use the wireless data services. For example, a smartphone may execute a video-conferencing application that communicates with a conferencing server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Interworking Functions (IWFs), Access and Mobility Management Functions (AMFs), Session Management Functions (SMFs), User Plane Functions (UPFs), and the like.

Internet Protocol Multimedia Subsystem (IMS) registers user contact information like phone number and Internet Protocol (IP) address. IMS brokers messaging between two users to agree on a session before distributing the IP addresses for the session. The wireless user devices then use the IP addresses to exchange media like user video and audio. IMS also transfers data messages between users by using SIP messaging between the users and an IMS message hub.

When invited to a SIP session, the SIP messages indicate some information about inviting user like phone number, name, and the like. In some examples, IMS transfers SIP messages to a user server that adds inviting user information like pictures and internet links to the SIP messages. The user server then returns the SIP messages to IMS for transfer to the users. Unfortunately, the use of the external user server is slow and lacks security. Moreover, the wireless communication network transfers limited information about the inviting party in the SIP messages.

TECHNICAL OVERVIEW

In a wireless communication network, a user server receives user information from an inviting user for presentation to an invited user. A Session Initiation Protocol (SIP) server receives an originating SIP invite to the invited user from the inviting user and transfers a request to the user server for the user information from the inviting user for the invited user. The user server responds with the user information from the inviting user for the invited user. The SIP server transfers a terminating SIP invite for the invited user from the inviting user that has the user information from the inviting user for the invited user. A User Equipment (UE) receives terminating SIP invite and responsively presents the user information from the inviting user to the invited user.

DETAILED DESCRIPTION

Figure 1:
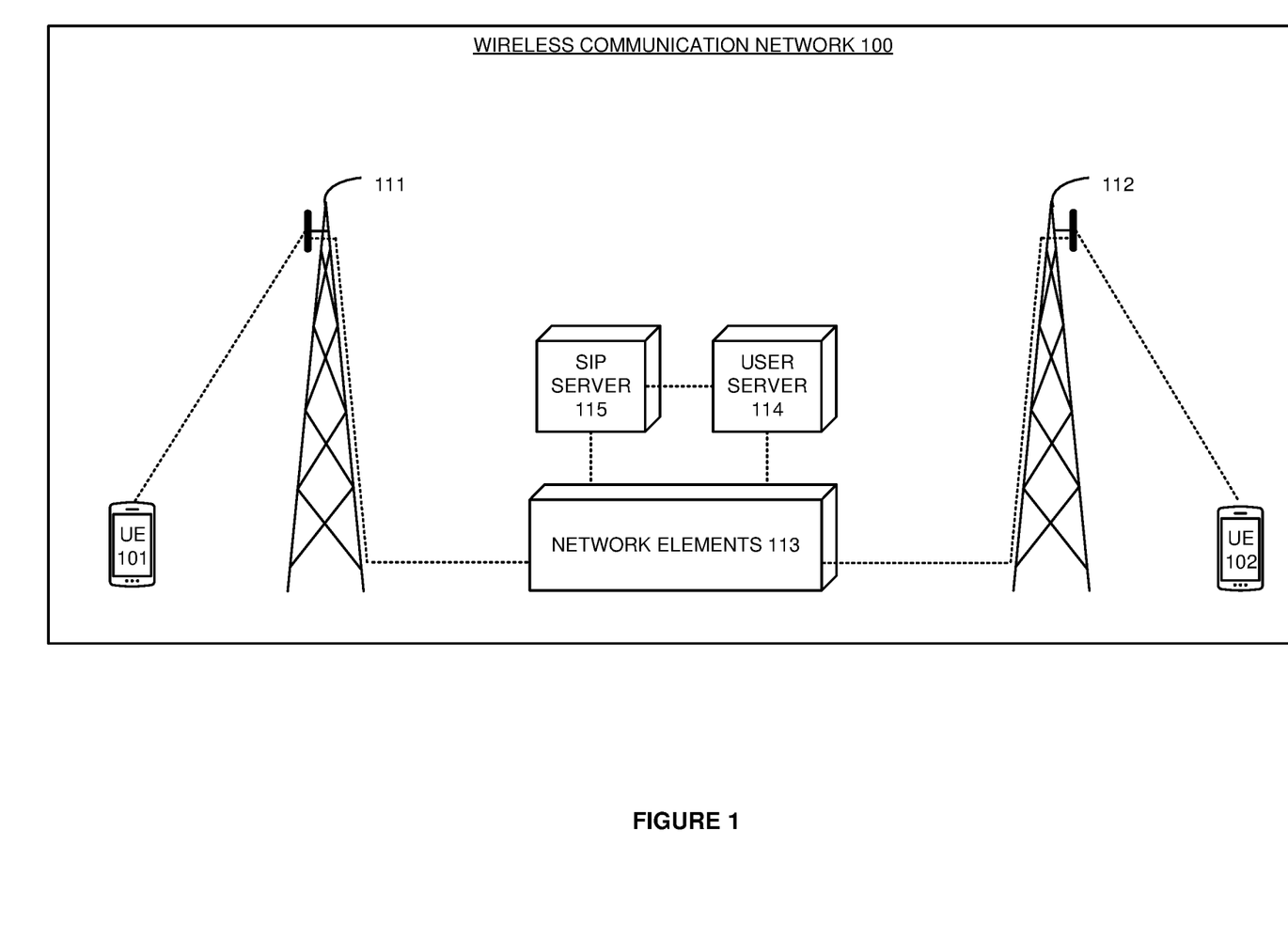
FIG. 1 illustrates an exemplary wireless communication network to transfer user information from an inviting user to an invited user over Session Initiation Protocol (SIP).

FIG. 1 illustrates exemplary wireless communication network 100 to transfer user information from an inviting user to an invited user over Session Initiation Protocol (SIP). Wireless communication network 100 comprises UEs 101-102, wireless access nodes 111-112, network elements 113, user server 114, and SIP server 115. UEs 101-102 comprise computers, phones, vehicles, sensors, robots, or some other data appliance with data communication circuitry. Exemplary wireless data services include media-conferencing, messaging, machine-control, and/or some other SIP-based networking product. Wireless communication network 100 is simplified for clarity and typically includes more UEs and wireless access nodes than shown.

Various examples of network operation and configuration are described herein. In some examples, the inviting user operates UE 101, and the invited user operates UE 102. UE 101 transfers user information to user server 114 over wireless access node 111 and network elements 113. The user information characterizes the inviting user in the manner desired for the invited user through the use of photographs, video, uniform resource locators, and the like. User server 114 receives the user information from UE 101. Subsequently, UE 101 transfers an originating SIP invite for the invited user of UE 102 to SIP server 115 over wireless access node 111 and network elements 113. The SIP invite could be for a voice call, video session, short message, or some other data session. SIP server 115 receives the SIP invite for the invited user of UE 102 from the inviting user of UE 101. In response, SIP server 115 transfers a request to user server 114 for the user information from the inviting user of UE 101 for the invited user of UE 102. User server 114 receives the request and transfers a response to SIP server 115 that indicates the user information from the inviting user of UE 101 for delivery to the invited user of UE 102. In some examples, SIP server 115 calls an Application Programming Interface (API) on user server 115 with identifiers for the inviting user, invited user, and session type to obtain the corresponding user information for presentation to the invited user. SIP server 115 receives the response and transfers a terminating SIP invite to the invited user from the inviting user to UE 102 over network elements 113 and wireless access node 112. The terminating SIP invite that has the user information from the inviting user of UE 101 for the invited user of UE 102. UE 102 receives the terminating SIP invite (or a version of the terminating SIP invite) and presents the user information from the inviting user of UE 101 to the invited user of UE 102. For example, UE 102 may present a recent photograph of the inviting user of UE 101 and the invited user of UE 102.

In some examples, the user information from the inviting user and UE 101 includes triggers for the network addition of geographic location data, user authentication data, and/or a digital certificate. User server 114 detects the triggers in the user data from UE 101 and adds geographic location data, user authentication data, and/or a digital certificate for UE 101 to the response to SIP server 115. For example, UE 102 may present a recent photograph, current geographic location, authentication status, and a digital certificate for the inviting user of UE 101.

UE 101 may access user server 114 over the internet or another network instead of wireless access node 111 and network elements 113. UEs 101-102 may access network elements 113 over the internet or another network instead of wireless access nodes 111-112. UE 102, wireless access node 112, and a portion of network elements 113 could be in a different network from UE 101, wireless access node 111, and the other portion of network elements 113. User server 114 may comprise a web server configured for secure and convenient internet transactions. SIP server 115 may comprise an Internet Protocol Subsystem (IMS) telephony server, IMS message server, and/or IMS Call State Control Function (CSCF) server. In some examples, SIP server 115 transfers the user information in the terminating SIP invite in an inviting-user-information SIP header. UE 102 of the invited user presents the user information for the inviting user in response to the inviting-user-information SIP header.

Advantageously, user server 114 and SIP server 115 have a direct Application Programming Interface (API) to rapidly transfer specific user information to SIP server 115 for secure SIP message handling in SIP server 115. Moreover, wireless communication network 100 efficiently augments the user information with location and authenticity data for the inviting user.

UEs 101-102 and wireless access nodes 111-112 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless access nodes 111-112, network elements 113, and servers, 114-115 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-102 and wireless access nodes 111-112 include radios. UEs 101-102, wireless access nodes 111-112, elements 113, and servers 114-115 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein.

Figure 2:
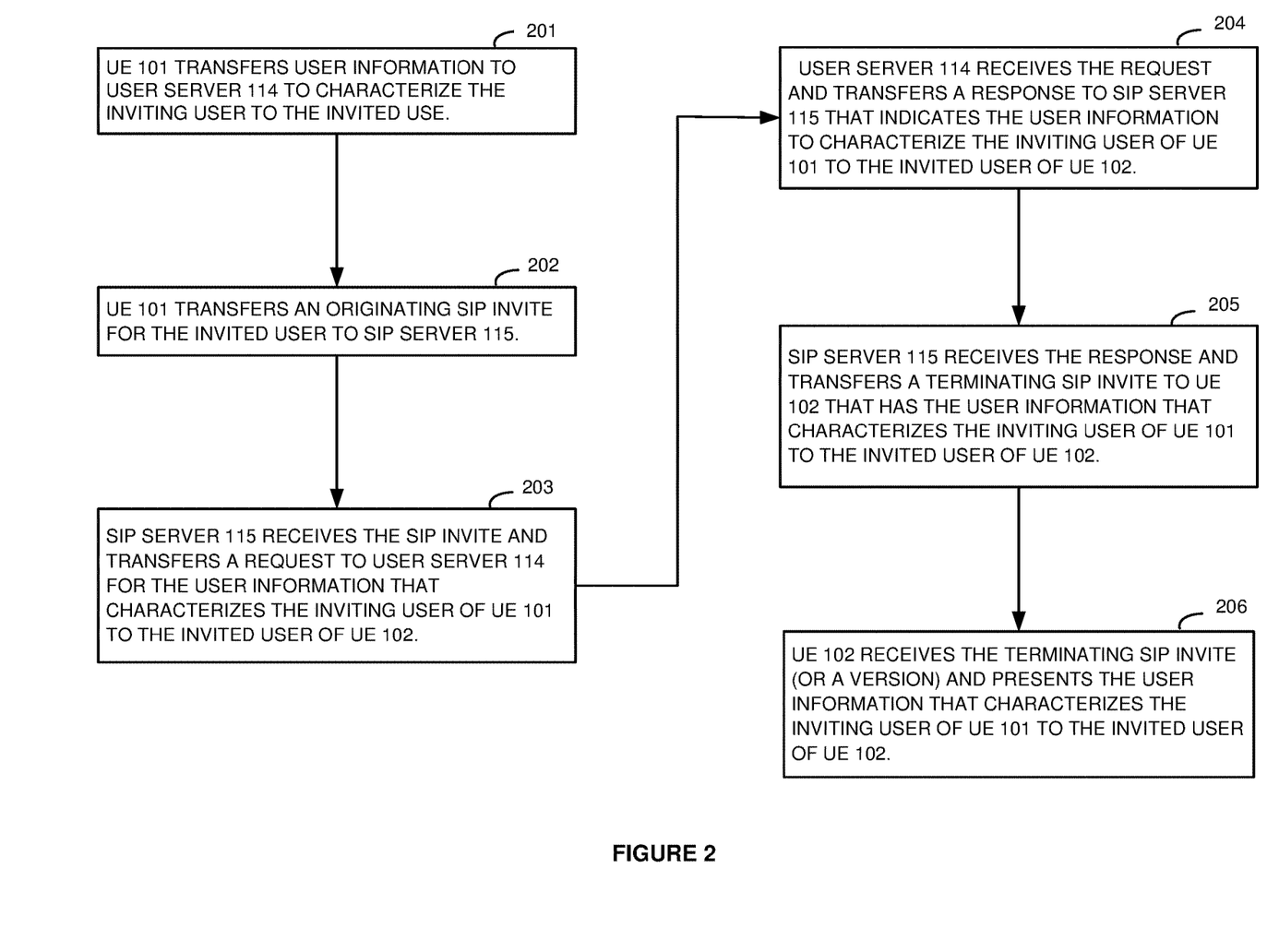
FIG. 2 illustrates an exemplary operation of the wireless communication network to transfer user information from an inviting user to an invited user over SIP.

FIG. 2 illustrates an exemplary operation of the wireless communication network to transfer user information from an inviting user to an invited user over SIP. The operation may differ in other examples. UE 101 transfers user information to user server 114 to characterize the inviting user to the invited user (201). UE 101 transfers an originating SIP invite for the invited user to SIP server 115 (202). SIP server 115 receives the SIP invite and transfers a request to user server 114 for the user information that characterizes the inviting user of UE 101 to the invited user of UE 102 (203). User server 114 receives the request and transfers a response to SIP server 115 that indicates the user information to characterize the inviting user of UE 101 to the invited user of UE 102 (204). SIP server 115 receives the response and transfers a terminating SIP invite to UE 102 that has the user information that characterizes the inviting user of UE 101 to the invited user of UE 102 (205). UE 102 receives the terminating SIP invite (or a version) and presents the user information that characterizes the inviting user of UE 101 to the invited user of UE 102 (206).

Figure 3:
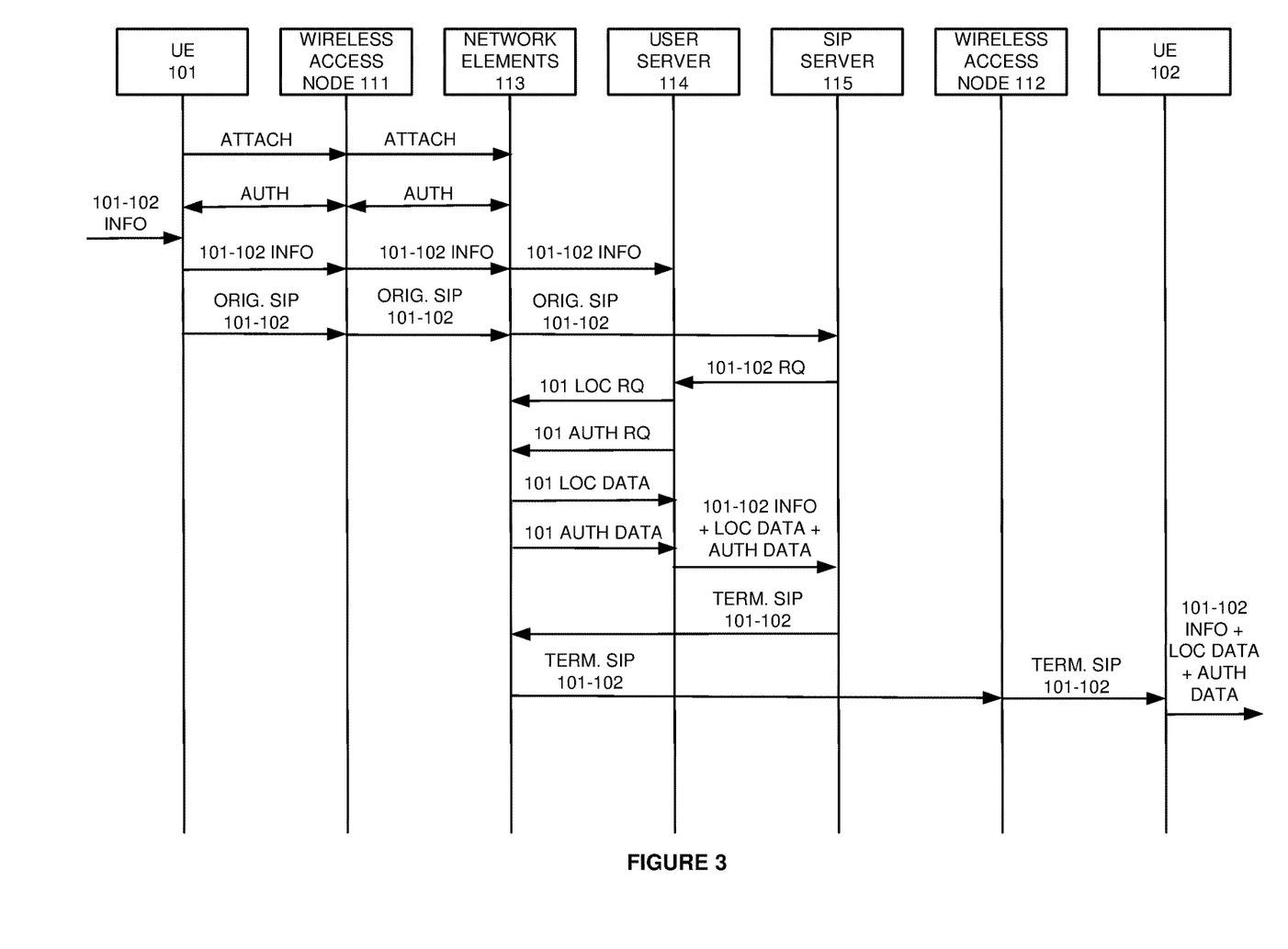
FIG. 3 illustrates an exemplary operation of the wireless communication network to transfer user information from an inviting user to an invited user over SIP.

FIG. 3 illustrates an exemplary operation of the wireless communication network to transfer user information from an inviting user to an invited user over SIP. The operation may differ in other examples. UE 101 attaches wireless network elements 113 over wireless access node 111. UE 101 and wireless network elements 113 exchange authentication data over wireless access node 111 to authenticate the identity of UE 101. UE 101 receives user information from the inviting user of UE 101 for delivery to the invited user of UE 102 in future SIP invites. The user information characterizes the inviting user in the manner desired by the invited user through the use of photographs, video, uniform resource locators, and the like. The user information includes triggers for network 100 to add user location, network status, and certificates. User server 114 receives and stores the user information. UE 101 transfers an originating SIP invite to SIP server 115 over wireless access node 111 and network elements 113. The originating SIP invite is from the inviting user of UE 101 to the invited user of UE 102. The SIP invite could be for a voice call, video session, short message, or some other session. SIP server 115 receives the SIP invite, and in response, SIP server 115 transfers a request to user server 114 for the user information from the inviting user of UE 101 for the invited user of UE 102. User server 114 receives the request and transfers requests for location and authentication data for UE 101 to network elements 113 in response to the triggers. Network elements 113 respond to user server 114 with the location and authentication data for UE 101. User server 114 responds to SIP server 115 with the location and authentication data for UE 101. SIP server 115 adds the location and authentication data for UE 101 to a terminating SIP invite. The terminating SIP invite is from the inviting user to the invited user and may include other user information in addition to the location and authentication data. SIP server 115 transfers the terminating SIP invite to UE 102 over network elements 113 and wireless access node 112. UE 102 receives the terminating SIP invite or a version of the terminating SIP invite generated by intermediate systems. UE 102 presents the user information from the inviting user of UE 101 to the invited user of UE 102 in response to the SIP message—including the location, status, and certificate for UE 101 of the inviting user.

Figure 4:
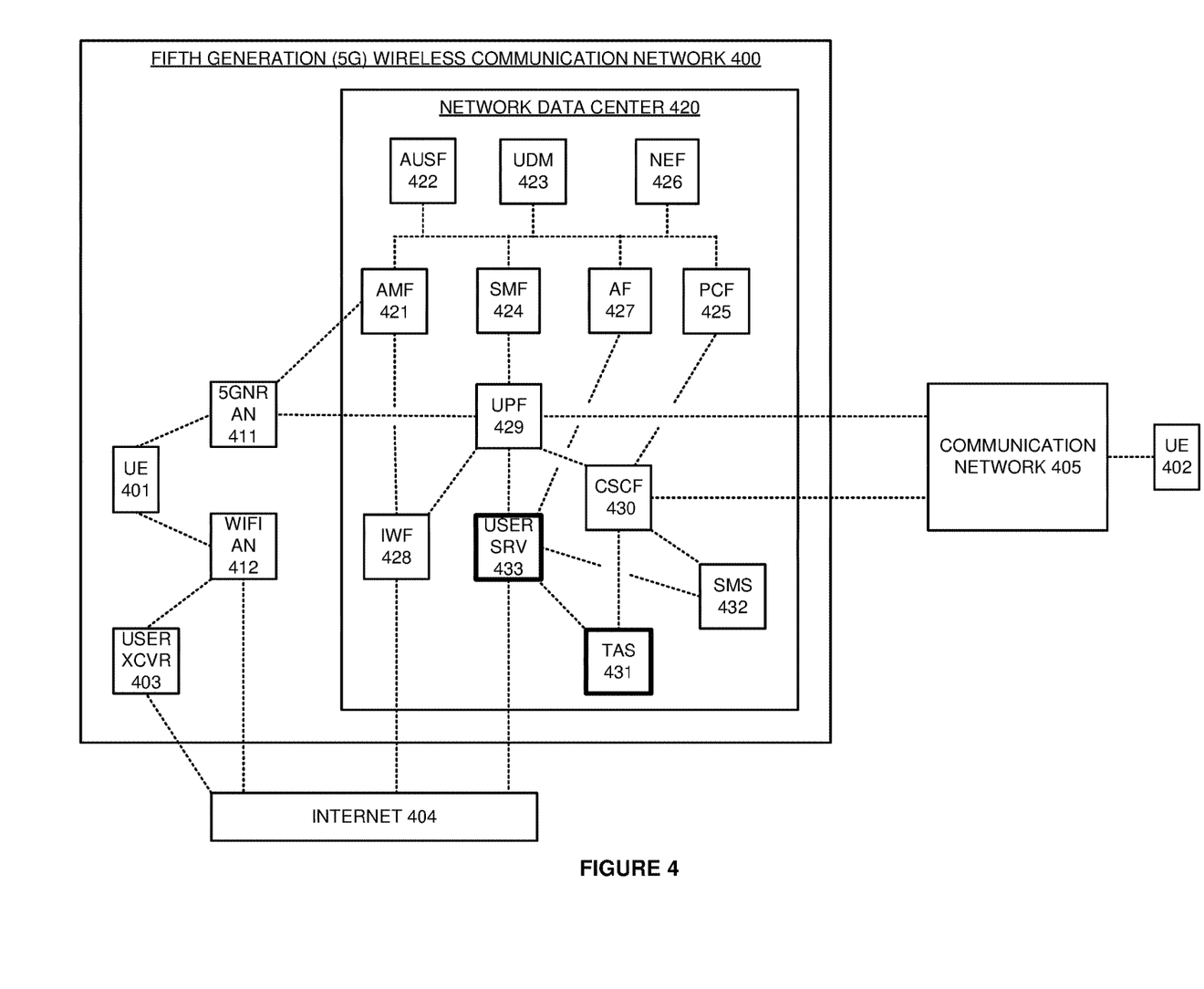
FIG. 4 illustrates an exemplary Fifth Generation (5G) wireless communication network to transfer user information from an inviting user to an invited user over SIP.

FIG. 4 illustrates exemplary Fifth Generation (5G) wireless communication network 400 to transfer user information from an inviting user to an invited user over SIP. 5G wireless communication network 400 comprises an example of wireless communication network 100, although network 100 may differ. 5G wireless communication network 400 comprises: UE 401, user transceiver (XCVR) 403, 5GNR Access Node (AN) 411, WIFI AN 412, and network data center 420. Network data center 420 comprises Access and Mobility Management Function (AMF) 421, Authentication and Security Function (AUSF) 422, Unified Data Management (UDM) 423, Session Management Function (SMF) 424, Policy Control Function (PCF) 425, Network Exposure Function (NEF) 426, Application Function (AF) 427, non-Third Generation Partnership Project (non-3GPP) Interworking Function (IWF) 428, User Plane Function (UPF) 429, Call State Control Functions (CSCF) 430, Telephony Application Server (TAS) 431, Short Message Service server (SMS) 432, and user server 433.

The inviting user of UE 401 has options for accessing user server 433 and TAS 431 that include at least: 1) UE 401-5GNR AN 411-UPF 429, 2) UE 401-WIFI AN 412-internet 404-IWF 428-UPF 429, 3) UE 401-WIFI AN 412-internet 404, 4) user transceiver 403-WIFI AN 412-internet 404, and 5) user transceiver 403-internet 404. UE 401 may wirelessly attach to 5GNR AN 411 and authenticate with AMF 421. AMF 421 interacts with AUSF 422 which interacts with UDM 423 to perform the authentication. AMF 421 transfers authenticity data for UE 401 to NEF 426 like the time and UE location of the last successful authentication. AMF 421 updates the location data for UE 401 to NEF 426 along with any changes to authentication status. AMF 421 selects default bearers for UE 401 like an Internet Protocol Multimedia Subsystem (IMS) bearer to CSCF 430 and an internet-access bearer to communication network 405. SMF 424 implements the selected bearers through UPF 429—although multiple UPFs may be used. AMF 421 signals instructions for the default bearers to 5GNR AN 411. AMF 421 signals instructions for the default bearers to UE 401 and indicates the network address for user server 433. SMF 424 implements the selected bearers through UPF 429. UE 401 communicates with user server 433 over UPF 429 using one of these default bearers. The user of UE 401 operates UE 401 to load user information for presentation to the invited user of UE 402 for a video chat invite. In this example, the user information comprises a photograph of the user of UE 101, a digital certificate signed with a private key of the user of UE 101, a trigger for current UE 101 location, and a trigger for current UE 101 authenticity.

Subsequently, the inviting user of UE 101 operates UE 401 to request a video chat with the invited user of UE 402. In response, UE 401 transfers a SIP invite to CSCF 430 over the IMS bearer. The SIP invite is for the invited user of UE 402 to participate in a video chat with the inviting user of UE 401. CSCF 430 forwards the SIP invite to TAS 431. In response to the SIP invite, TAS 431 transfers a request to user server 433 for the user information from the inviting user of UE 401 to the invited user of UE 402 for a video chat invite. User server 433 receives the request and retrieves the user information previously transferred by the inviting user of UE 401 for presentation to the invited user of UE 402 for a video chat. In some examples, TAS 431 calls an API on user server 433 that is optimized for speed to obtain the user information for presentation to the invited user of UE 102 from the inviting user of UE 401 for a video chat session. In this example, the user information includes triggers for current UE 401 location and authenticity. In response to the triggers, user server 433 transfers a request to AF 427 for the current location and authenticity data for UE 401. AF 427 forwards the request to NEF 426, and NEF 426 returns the current location and authenticity data for UE 401 to user server 433 over AF 427. User server 433 transfers the user information (picture, digital certificate, current location, and authenticity data) for the inviting user and UE 401 to TAS 431. TAS 431 directs CSCF 430 to transfer a SIP invite for delivery to UE 402 over communication network 405. The SIP invite has a SIP header for inviting-user information. The inviting-user SIP header includes the picture, digital certificate, current location, and authenticity data for the inviting user of UE 401 for presentation to the invited user of UE 402. CSCF 430 transfers the SIP invite for UE 402 to communication network 405 for delivery to UE 402. Communication network 405 typically generates a new version of the SIP invite that will be delivered to UE 402 and that also has the user information in the inviting-user-info SIP header. Communication network 405 transfers the new version of the SIP invite to UE 402. UE 402 receives the new version of the SIP invite, and in response to the inviting-user-info SIP header, UE 402 presents the user information from the inviting user of UE 401 to the invited user of UE 402. In this example, UE 402 successfully validates the digital certificate with the public key of the inviting user. UE 402 presents the invite to the video chat from the inviting user along with the user information. UE 402 indicates the successful validation of the digital certificate from the inviting user. UE 402 presents the current geographic location and authenticity status of UE 401. The invited user of UE 402 accepts the invite based on the user information and returns a SIP OK to CSCF 430 over communication network 430. CSCF 430 indicates the SIP OK to TAS 431. TAS 431 initiates additional SIP messaging to share IP addresses between UEs 401-402. UEs 401-402 then exchange their video chat data over 5GNR AN 411, UPF 429, and communication network 405 using the shared IP addresses.

In some examples, the user of UE 401 operates UE 401 to load user information for presentation to the invited user of UE 402 for a Short Message Service (SMS) message. In this example, the user information comprises a trigger for current UE 101 location and a trigger for current UE 101 authenticity. The inviting user of UE 101 operates UE 401 to transfer an SMS message to UE 402. In response, UE 401 transfers a SIP invite that transports the SMS message to CSCF 430 over the IMS bearer. CSCF 430 forwards the SIP invite to SMS 432. In response to the SIP invite, SMS 432 transfers a request to user server 433 for the user information from the inviting user of UE 401 to the invited user of UE 402 for an SMS message. User server 433 receives the request and retrieves the user information previously transferred by the inviting user of UE 401 for presentation to the invited user of UE 402 for an SMS message. In this example, the user information includes triggers for current UE 401 location and authenticity. In response to the triggers, user server 433 transfers a request to AF 427 for the current location and authenticity data for UE 401. AF 427 forwards the request to NEF 426, and NEF 426 returns the current location and authenticity data for UE 401 to user server 433 over AF 427. User server 433 transfers the user information (current location and authenticity data) for the inviting user and UE 401 to SMS 432. SMS 432 directs CSCF 430 to transfer a SIP invite for delivery to UE 402 over communication network 405. The SIP invite has a SIP header for inviting-user-info and another SIP header for the SMS message. The inviting-user-info SIP header includes the current location and authenticity data for UE 401. CSCF 430 transfers the SIP invite for UE 402 to communication network 405 for delivery to UE 402. Communication network 405 typically generates a new version of the SIP invite that will be delivered to UE 402 and that also has the user information in the inviting-user-info SIP header. Communication network 405 transfers the new version of the SIP invite to UE 402. UE 402 receives the new version of the SIP invite, and in response to the inviting-user-info SIP header, UE 402 presents the user information for the inviting user of UE 401 to the invited user of UE 402. In this example, UE 402 presents SMS message along with the current geographic location and authenticity status of UE 401.

UE 401 may wirelessly attach to WIFI AN 411 and register with IWF 428 over internet 404. UE 401 authenticates with AMF 421 over WIFI AN 412 and IWF 428. UE 401 communicates with UPF 429 over WIFI AN 412 and IWF 428. The operation is similar to that described above although UE access is over AN 412, internet 404, and IWF 428 instead of 5GNR AN 411. Other technologies like ethernet and bluetooth may be used to access IWF 428 over internet 404. In addition, the inviting user of UE 401 may operate user transceiver 403 to access user server 433 over WIFI AN 412 and internet 404 or some other access technology. For example, the inviting user may operate a laptop computer to transfer user information to user server 433 over WIFI AN 412 and internet 404 in a secure web-based transaction. Likewise, UE 401 may transfer the SIP invite to CSCF 430 over WIFI AN 412 and internet 404 or some other access technology and internet 404.

Figure 5:
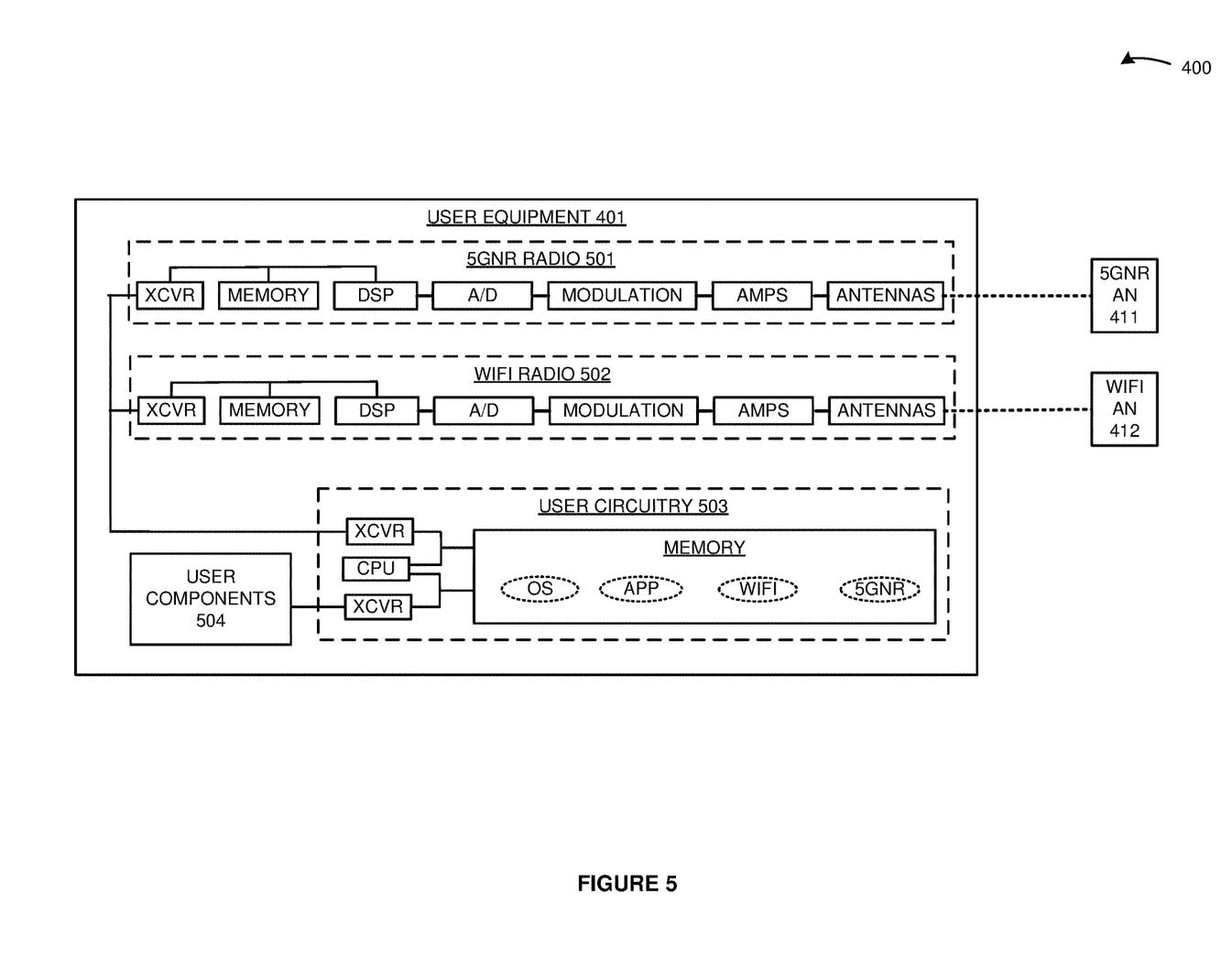
FIG. 5 illustrates an exemplary UE in the 5G wireless communication network.

FIG. 5 illustrates exemplary UE 401 in 5G wireless communication network 400. UE 401 comprises an example of UEs 101-102 and 402, although UEs 101-102 and 402 may differ. UE 401 comprises 5GNR radio 501, WIFI radio 502, user circuitry 503, and user components 504. User components 504 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. User circuitry 503 comprises memory, CPU, user interfaces and components, and transceivers that are coupled over bus circuitry. The memory in user circuitry 503 stores an operating system (OS), user applications (APP), and network applications for WIFI and 5GNR. The antennas in 5GNR radio 501 are wirelessly coupled to 5GNR access node 411 over a 5GNR link. The antennas in WIFI radio 502 are wirelessly coupled to WIFI access node 412 over a WIFI link. Transceivers (XCVRs) in radios 501-502 are coupled to transceivers in user circuitry 503. Transceivers in user circuitry 503 are coupled to user components 504. The CPU in user circuitry 503 executes the operating system, user applications, and network applications to exchange network signaling and user data with ANs 411-412 over radios 501-502. In some examples, some of the 5GNR and WIFI components could be omitted. For example, the 5GNR portion could be omitted to form a WIFI-only UE. The WIFI portion could be omitted to form a 5GNR-only UE. Other device combinations could be used including the use of other data communication protocols.

Figure 6:
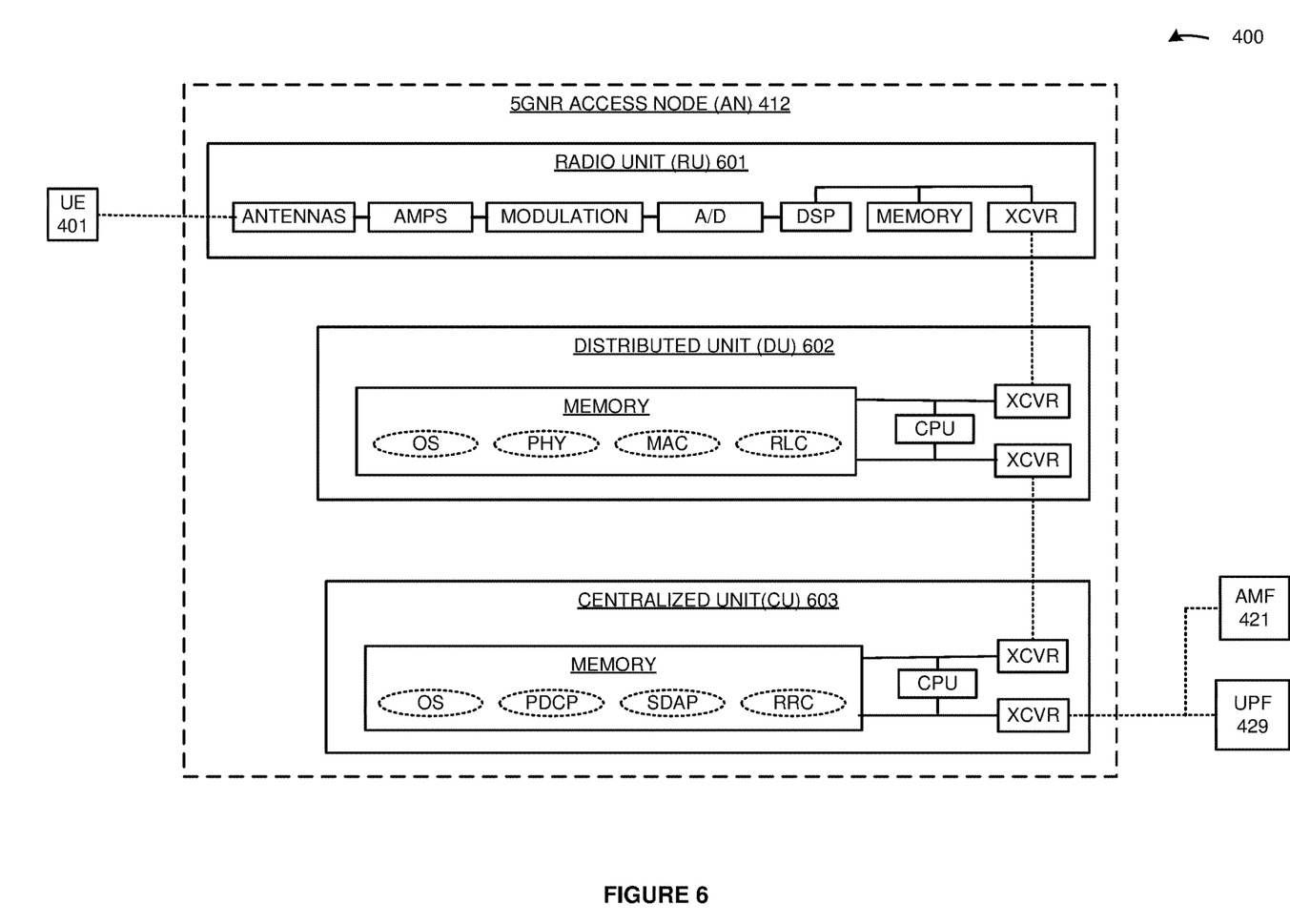
FIG. 6 illustrates an exemplary 5G New Radio (5GNR) access node in the 5G wireless communication network.

FIG. 6 illustrates exemplary 5G New Radio (5GNR) Access Node (AN) 411 in 5G wireless communication network 400. 5GNR access node 411 comprises an example of wireless access nodes 111-112 although access nodes 111-112 may differ. 5GNR access node 411 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system 604 and network applications for Physical Layer (PHY), Media Access Control (MAC), and Radio Link Control (RLC). CU 603 comprises memory, CPU, user interfaces and components, and transceivers that are coupled over bus circuitry. The memory in CU 603 stores an operating system and network applications for Packet Data Convergence Protocol (PDCP), Service Data Adaption Protocol (SDAP), and Radio Resource Control (RRC). The antennas in RU 601 are wirelessly coupled to UE 401 over 5GNR links. Transceivers in RU 601 are coupled to transceivers in DU 602. Transceivers in DU 602 are coupled to transceivers in CU 603. Transceivers in CU 603 are coupled to AMF 421 and UPF 429. The DSP and CPU in RU 601, DU 602, and CU 603 execute radio applications, operating systems, and network applications to exchange network signaling and user data with UE 401, AMF 421, and UPF 429.

Figure 7:
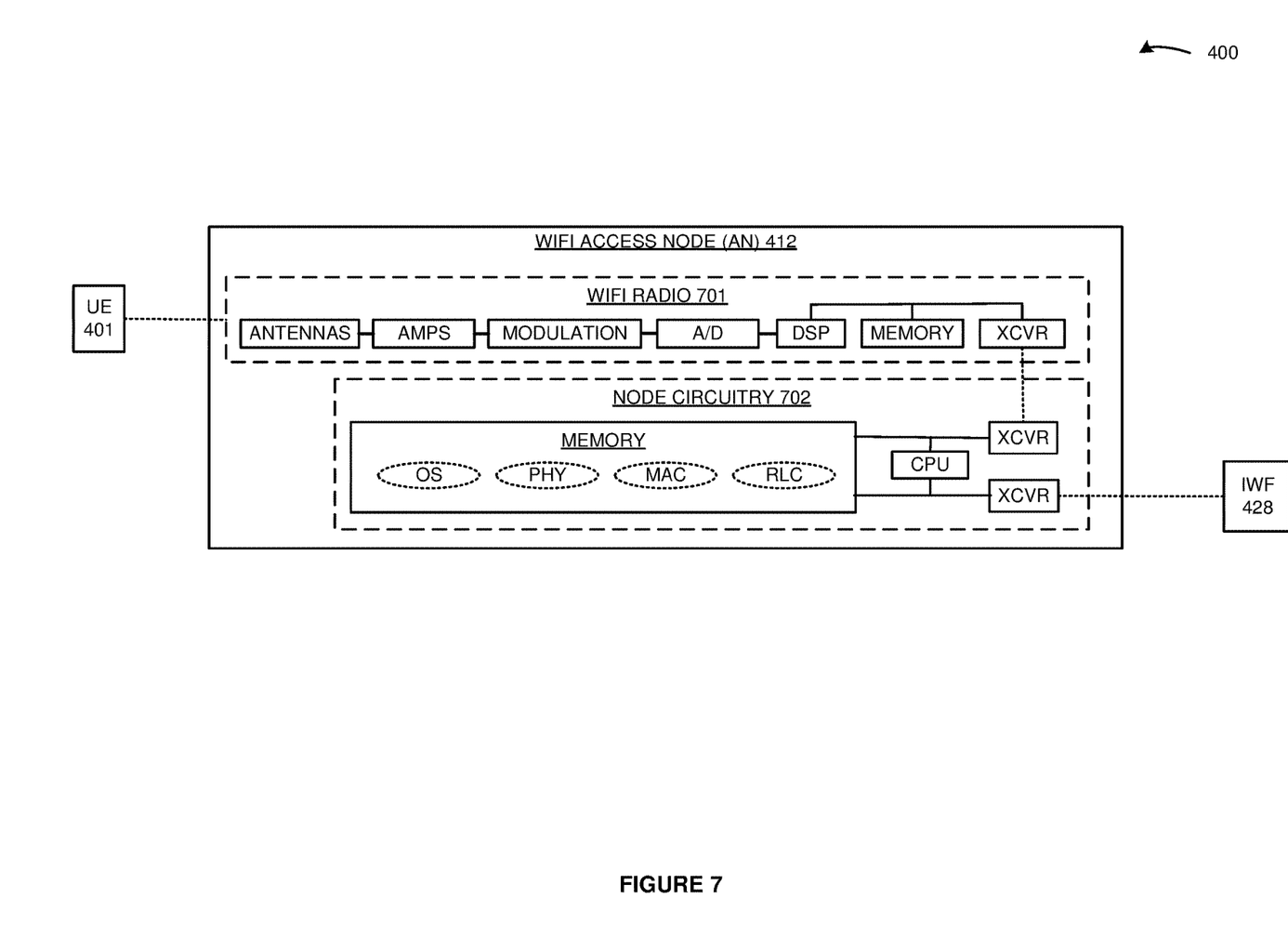
FIG. 7 illustrates an exemplary Wireless Fidelity (WIFI) access node in the 5G wireless communication network.

FIG. 7 illustrates exemplary WIFI Access Node (AN) 412 in 5G wireless communication network 400. WIFI access node 412 comprises examples of wireless access nodes 111-112, although access nodes 111-112 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and WIFI (PHY, MAC, RLC). The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 428. The CPU in node circuitry 704 executes the operating system and network applications to exchange network signaling and user data with UE 401 and with IWF 428.

Figure 8:
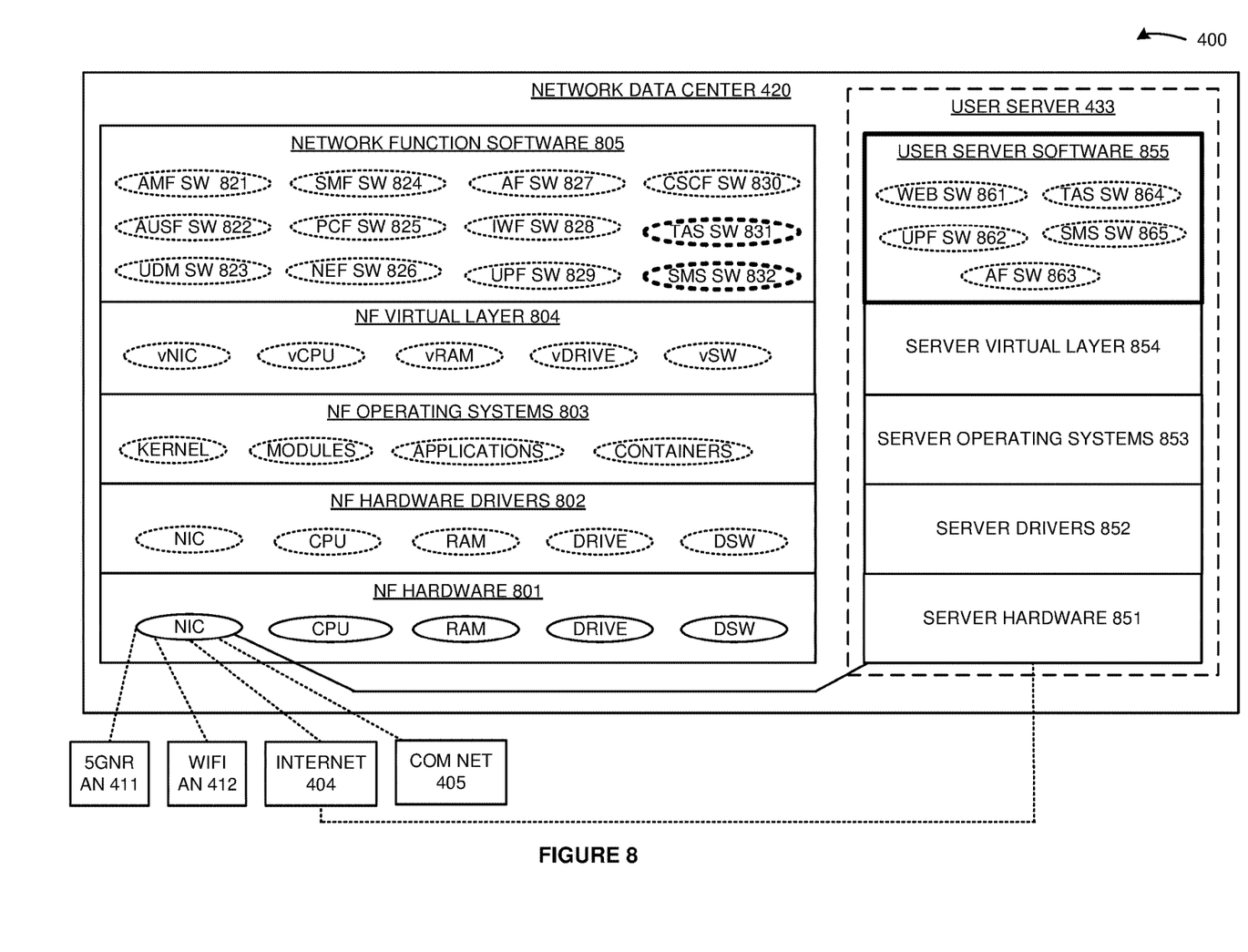
FIG. 8 illustrates an exemplary network data center in the 5G wireless communication network.

FIG. 8 illustrates exemplary network data center 420 in 5G wireless communication network 400. Network data center 420 comprises an example of network elements 113, user server 114, and SIP server 115, although elements 113 and servers 114-115 may differ. Network data center 420 comprises Network Function (NF) hardware 801, NF hardware drivers 802, NF operating systems 803, NF virtual layer 804, and NF Software (SW) 805, Server hardware 851, server hardware drivers 852, server operating systems 853, server virtual layer 854, and user server SW 855. NF hardware 801 comprises Network Interface Cards (NICs), CPU, RAM, Flash/Disk Drives (DRIVE), and Data Switches (DSW). Server hardware 851 could be similar. NF hardware drivers 802 comprise software that is resident in the NIC, CPU, RAM, DRIVE, and DSW. Server hardware drivers 852 could be similar. NF operating systems 803 comprise kernels, modules, and applications that form containers for virtual layer and NF software execution. Server operating systems 853 could be similar. NF virtual layer 804 comprises vNIC, vCPU, vRAM, vDRIVE, and vSW. Server virtual layer 854 could be similar. NF SW 805 comprises AMF SW 821, AUSF SW 822, UDM SW 823, SMF SW 824, PCF SW 825, NEF SW 826, AF SW 827, IWF SW 828, UPF SW 829, CSCF SW 830, TAS SW 831, AND SMS SW 832. Other NFs like Network Repository Function (NRF) are typically present but are omitted for clarity. Server SW 855 comprises web Interface (IF) SW 861, UPF IF SW 862, AF IF SW 863, TAS IF SW 864, and SMS IF SW 865. Network data center 420 may be located at a single site or be distributed across multiple geographic locations. The NIC in NF hardware 801 are coupled to access nodes 411-412, internet 404, communication network 405, and the NICs in server hardware 851. The NIC in server hardware 851 are coupled to the NIC in NF hardware 801 and the internet. NF hardware 801 executes NF hardware drivers 802, NF operating systems 803, NF virtual layer 804, and NFs 805 to form and operate AMF 421, AUSF 422, UDM 423, SMF 424, PCF 425, NEF 426, AF 427, IWF 428, UPF 429, CSCF 430, TAS 431, and SMS 432. Server hardware 851 executes server hardware drivers 852, server operating systems 853, server virtual layer 854, and server SW 855 to form and operate user server 433 which comprises a Web Interface (IF), UPF IF, AF IF, TAS IF, and SMS IF.

Figure 9:
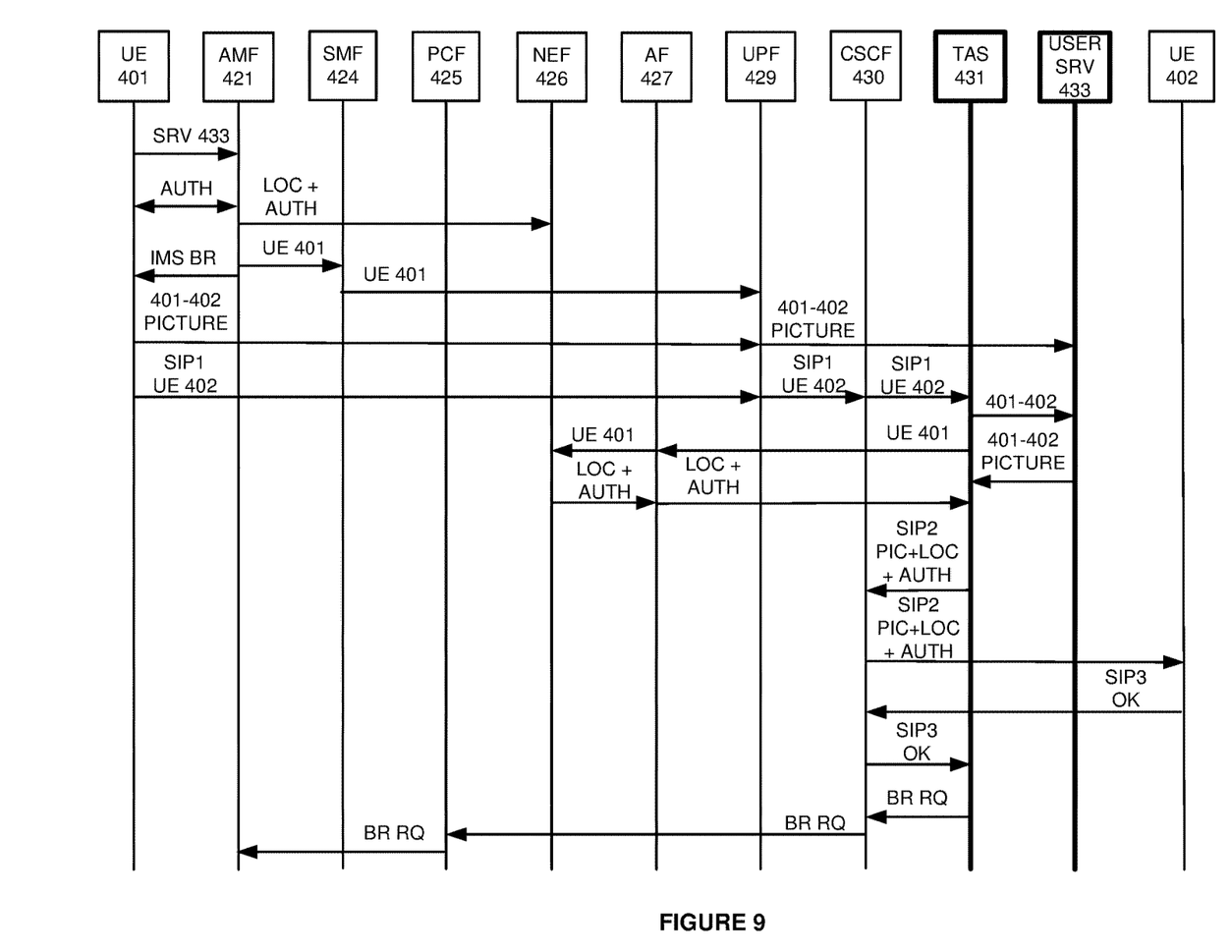
FIG. 9 illustrates an exemplary operation of the 5G wireless communication network to transfer user information from an inviting user to an invited user over SIP.

FIG. 9 illustrates an exemplary operation of 5G wireless communication network 400 to transfer user information from an inviting user to an invited user over SIP. The operation may differ in other examples. For clarity, the access portion is omitted and may occur over various access technologies. UE 401 requests an IMS bearer to access to user server 433 and CSCF 430 from AMF 421. AMF 421 authenticates UE 401 by matching hash results generated in both UE 401 and UDM 423. AMF 421 transfers the location and authenticity of UE 401 to NEF 426. AMF 421 authorizes the IMS bearer for UE 401 and signals SMF 424 to serve the IMS bearer to UE 401. SMF 424 implements the IMS bearer through UPF 429. AMF 421 signals instructions for the IMS bearer to UE 401 and indicates the network address for user server 433. UE 401 communicates with user server 433 over UPF 429 using the IMS bearer. The user of UE 401 operates UE 401 to load user information for presentation to the invited user of UE 402 for a video chat invite. In this example, the user information comprises a photograph of the user of UE 101, a trigger for current UE 101 location, and a trigger for current UE 101 authenticity.

Subsequently, the inviting user of UE 101 operates UE 401 to request a video chat with the invited user of UE 402. In response, UE 401 transfers a SIP invite (SIP1) to CSCF 430 over UPF 429 and the IMS bearer. The SIP invite is for the invited user of UE 402 to participate in a video chat with the inviting user of UE 401. CSCF 430 forwards the SIP invite to TAS 431. In response to the SIP invite, TAS 431 transfers a request to user server 433 for the user information from the inviting user of UE 401 to the invited user of UE 402 for a video chat invite. User server 433 receives the request and retrieves the picture previously transferred by the inviting user of UE 401 for presentation to the invited user of UE 402 for a video chat. In this example, the user information also includes triggers for current UE 401 location and authenticity. In response to the triggers, user server 433 transfers a request to AF 427 for the current location and authenticity data for UE 401. AF 427 forwards the request to NEF 426, and NEF 426 returns the current location and authenticity data for UE 401 to user server 433 over AF 427. User server 433 transfers the user information (picture, current location, and authenticity data) for the inviting user and UE 401 to TAS 431. TAS 431 directs CSCF 430 to transfer a SIP invite (SIP2) for delivery to UE 402 over communication network 405. The SIP invite has a SIP header for inviting-user-info. The inviting-user-info SIP header includes the picture, current location, and authenticity data for the inviting user of UE 401 for presentation to the invited user of UE 402. CSCF 430 transfers the SIP invite for UE 402 to communication network 405 for delivery to UE 402. Communication network 405 transfers a version of the SIP invite to UE 402. UE 402 receives the version of the SIP invite, and in response to the inviting-user-info SIP header, UE 402 presents the user information to the invited user of UE 402. In this example, UE 402 presents the invite to the video chat from the inviting user along with the picture, current geographic location, authenticity status. The invited user of UE 402 accepts the invite based on the user information and returns a SIP OK (SIP3) to CSCF 430 over communication network 405. CSCF 430 indicates the SIP OK to TAS 431. TAS 431 initiates a bearer request for the video chat to CSCF 430 which forwards the request for the video chat bearer for UE 401 to PCF 425. PCF 425 forwards the request for the video chat bearer for UE 401 to AMF 421, and although not shown, the operation proceeds in a standard manner to complete the video chat.

The wireless data network circuitry described above comprises computer hardware and software that form special-purpose networking circuitry to transfer user information from an inviting user to an invited user over SIP. The computer hardware comprises processing circuitry like CPUs, DSPs, GPUs, transceivers, bus circuitry, and memory. To form these computer hardware structures, semi-conductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to transfer user information from an inviting user to an invited user over SIP.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to transfer user information from an inviting user to an invited user over Session Initiation Protocol (SIP), the method comprising:
   a user server receiving the user information transferred by an inviting User Equipment (UE) that characterizes the inviting user for presentation to the invited user;
   a Call Session Control Function (CSCF) receiving an originating SIP invite generated by the inviting UE for the invited user and forwarding the originating SIP invite to a Telephony Application Server (TAS);
   the TAS receiving the originating SIP invite from the CSCF and responsively transferring an Application Programming Interface (API) call that comprises identifiers for the inviting user, the invited user, and a session type to the user server to obtain the user information for presentation to the invited user;
   the user server receiving the API call, retrieving the user information based on the identifiers for the inviting user, the invited user, and the session type, and transferring a response to the TAS that indicates the user information from the inviting user for the invited user;
   the TAS receiving the response, indicating the user information to the CSCF, and directing the CSCF to transfer a terminating SIP invite from the inviting user to an invited UE; and
   the CSCF receiving the user information and transferring the terminating SIP invite for delivery to the invited UE that has the user information in a message header of the terminating SIP invite, wherein the invited UE receives one of the terminating SIP invite or a version of the terminating SIP invite and responsively presents the user information from the inviting user to the invited user.

2. The method of claim 1 wherein:
   the user information comprises geographic location data for the inviting user; and
   the invited UE presents the user information that comprises the geographic location data for the inviting user.

3. The method of claim 1 wherein:
   the user information received by the user server comprises a trigger for geographic location data for the inviting user; and further comprising:
   in response to the trigger and API call, the user server retrieving the geographic location data for the inviting user from a wireless network element and transferring the response that comprises the geographic location data for the inviting user to the TAS;
   the TAS receiving the response and indicating the geographic location data for the inviting user to the CSCF;
   the CSCF receiving the geographic location data for the inviting user and transferring the terminating SIP invite for delivery to the invited UE that has the geographic location data for the inviting user in the message header of the terminating SIP invite; and wherein:
   the invited UE presents the user information that comprises the geographic location data for the inviting user.

4. The method of claim 1 wherein:
   the user information comprises a digital certificate signed with a private key of the inviting user; and
   the invited UE responsively authenticates the digital certificate with a public key of the inviting user; and
   the invited UE presents the user information that comprises the authentication of the digital certificate.

5. The method of claim 1 wherein:
   the user information received by the user server comprises a trigger for inviting user authentication; and further comprising:
   in response to the trigger and the API call, the user server retrieving the user authentication data for the inviting user from a wireless network element transferring the response that comprises the user authentication data for the inviting user to the TAS;
   the TAS receiving the response and indicating the user authentication data for the inviting user to the CSCF;
   the CSCF receiving the user authentication data for the inviting user and transferring the terminating SIP invite for delivery to the invited UE that has the user authentication data for the inviting user in the message header of the terminating SIP invite; and wherein:
   the invited UE presents the user information that comprises the authentication data for the inviting user.

6. The method of claim 1 wherein:
   the message header comprises an inviting-user-information SIP header; and
   the invited UE presents the user information for the inviting user responsive to the inviting-user-information SIP header.

7. The method of claim 1 wherein the user server comprises a web server.

8. The method of claim 1 wherein the session type comprises a data session.

9. The method of claim 1 wherein the session type comprises a voice call.

10. The method of claim 1 wherein the session type comprises a video session.

11. A wireless communication network to transfer user information from an inviting user to an invited user over Session Initiation Protocol (SIP), the wireless communication network comprising:
    a user server configured to receive the user information transferred by an inviting User Equipment (UE) that characterizes the inviting user for presentation to the invited user;
    a Call Session Control Function (CSCF) configured to receive an originating SIP invite generated by the inviting UE for the invited user and forward the originating SIP invite to a Telephony Application Server (TAS);
    the TAS configured to receive the originating SIP invite from the CSCF and responsively transfer an Application Programming Interface (API) call that comprises identifiers for the inviting user, the invited user, and a session type to the user server to obtain the user information for presentation to the invited user;
    the user server configured to receive API call, retrieve the user information based on the identifiers for the inviting user, the invited user, and the session type, and transfer a response to the TAS that indicates the user information from the inviting user for the invited user;
    the TAS configured to receive the response, indicate the user information to the CSCF, and direct the CSCF to transfer a terminating SIP invite from the inviting user to an invited UE; and
    the CSCF configured to receive the user information and transfer the terminating SIP invite for delivery to the invited UE that has the user information in a message header of the terminating SIP invite, wherein the invited UE receives one of the terminating SIP invite or a version of the terminating SIP invite and responsively presents the user information from the inviting user to the invited user.

12. The wireless communication network of claim 11 wherein:
the user information comprises geographic location data for the inviting user; and
the invited UE presents the user information that comprises the geographic location data for the inviting user.

13. The wireless communication network of claim 11 wherein:
the user information received by the user server comprises a trigger for geographic location data for the inviting user; and further comprising:
in response to the trigger and the API call, the user server configured to retrieve the geographic location data for the inviting user from a wireless network element and transfer the response that comprises the geographic location data for the inviting user to the TAS;
the TAS configured to receive the response and indicate the geographic location data for the inviting user to the CSCF;
the CSCF configured to receive the geographic location data for the inviting user and transfer the terminating SIP invite for delivery to the invited UE that has the geographic location data for the inviting user in the message header of the terminating SIP invite; and wherein:
the invited UE presents the user information that comprises the geographic location data for the inviting user.

14. The wireless communication network of claim 11 wherein:
the user information comprises a digital certificate signed with a private key of the inviting user; and
the invited UE responsively authenticates the digital certificate with a public key of the inviting user; and
the invited UE presents the user information that comprises the authentication of the digital certificate.

15. The wireless communication network of claim 11 wherein:
the user information received by the user server comprises a trigger for inviting user authentication; and further comprising:
in response to the trigger and the API call, the user server is configured to retrieve the user authentication data for the inviting user from a wireless network element and transfer the response that comprises the user authentication data for the inviting user to the TAS;
the TAS configured to receive the response and indicate the user authentication data for the inviting user to the CSCF;
the CSCF configured to receive the user authentication data for the inviting user and transfer the terminating SIP invite for delivery to the invited UE that has the user authentication data for the inviting user in the message header of the terminating SIP invite; and wherein:
the invited UE presents the user information that comprises the authentication data for the inviting user.

16. The wireless communication network of claim 11 wherein:
the message header comprises an inviting-user-information SIP header; and
the invited UE presents the user information for the inviting user responsive to the inviting-user-information SIP header.

17. The wireless communication network of claim 11 wherein the user server comprises a web server.

18. The wireless communication network of claim 11 wherein the session type comprises a data session.

19. The wireless communication network of claim 11 wherein the session type comprises a voice call.

20. The wireless communication network of claim 11 wherein the session type comprises a video session.

* * * * *